United States Patent [19]

Howell

[11] 3,951,867

[45] Apr. 20, 1976

[54] COPRECIPITATED CEO$_2$–SNO$_2$ CATALYST SUPPORTS

[75] Inventor: Robert G. Howell, Corning, N.Y.

[73] Assignee: Corning Glass Works, Corning, N.Y.

[22] Filed: Oct. 7, 1974

[21] Appl. No.: 512,204

[52] U.S. Cl.............................. 252/462; 423/213.2
[51] Int. Cl.$^2$...................... B01J 23/10; B01J 23/14
[58] Field of Search................. 252/462; 423/213.2; 106/73.2

[56] References Cited
UNITED STATES PATENTS

| | | | |
|---|---|---|---|
| 3,397,154 | 8/1968 | Talsma | 423/213.2 X |
| 3,790,641 | 2/1974 | Oshima et al. | 252/462 X |

Primary Examiner—W. J. Shine
Attorney, Agent, or Firm—Kees van der Sterre; Clinton S. Janes, Jr.; Clarence R. Patty, Jr.

[57] ABSTRACT

A thermally-stable high-surface-area catalyst support material consisting of mixed CeO$_2$ and SnO$_2$ which have been coprecipitated from aqueous media, and the use of this CeO$_2$–SnO$_2$ support material to provide a base for noble and transition metal oxidation catalysts, are described.

4 Claims, 2 Drawing Figures

COPRECIPITATED $CeO_2$—$SnO_2$ CATALYST SUPPORTS

BACKGROUND OF THE INVENTION

The present invention is in the field of catalysis and specifically relates to improved oxide catalyst support materials of high surface area useful for supporting oxidation catalysts at elevated temperatures.

In general, catalyst support materials for gas-phase oxidation reactions should exhibit high surface area, refractoriness, and inertness toward the supported catalyst at high temperatures. High surface area in the support can increase the surface area of the supported catalyst or, at low catalyst loadings, insure a high degree of catalyst dispersion which retards activity loss resulting from catalyst agglomeration and sintering.

Gas phase oxidation reactions may involve elevated temperatures, e.g., ranging up to 800°C. or more, and a catalyst support material for this use should exhibit sufficient refractoriness to be useful at these temperatures. In particular, the catalyst support material should resist sintering and retain high surface area despite prolonged exposure to such temperatures.

The severe conditions which often accompany catalytic gas phase oxidation processes accelerate interactions between the supporting material and the catalyst, typically resulting in loss of activity. Therefore, the selected catalyst support should be highly inert with respect to the supported catalyst at the temperatures of use.

A wide variety of refractory metal oxides and metal oxide mixtures have been utilized to support noble metal and base metal oxide oxidation catalysts, including alumina, silica, magnesia, titania, zirconia, and mixtures thereof. However, some of these, such as alumina, are reactive with respect to base metal oxide catalysts such as copper chromite and cobalt oxide under the conditions encountered in high temperature oxidation reactions. Also, many exhibit substantially reduced surface areas following exposure to temperatures in the 800°C. range.

SUMMARY OF THE INVENTION

I have now discovered a mixed oxide support material exhibiting high surface area, excellent refractoriness, and a high degree of chemical inertness toward reactive catalysts. This support material consists of a mixture of $CeO_2$ and $SnO_2$ wherein the $SnO_2$ content ranges about 30–90 mole percent and the $CeO_2$ content ranges about 10–70 mole percent.

These support materials are prepared by coprecipitation of hydrous cerium oxide and hydrous tin oxide from aqueous solutions. Preparation in this manner produces a mixed oxide product which will retain a surface area of at least about 20 square meters per gram at temperatures not exceeding about 800°C., a surface area which is substantially higher than that of either $CeO_2$ or $SnO_2$ alone.

The properties of high surface area and good surface area retention at elevated temperatures in these support materials are attributed in part to an unusual microstructure produced by the coprecipitation process. This microstructure comprises $SnO_2$ platelets bearing a particulate dispersion of $CeO_2$. The desirable surface area properties attributed to this unusual microstructure have not been observed in mixed $CeO_2$—$SnO_2$ oxides produced by other methods.

Control of the composition of the mixed support material is also quite important in securing the desired refractoriness and high surface area obtainable in accordance with the invention. Pure $CeO_2$ and $SnO_2$ as well as mixtures thereof outside the composition ranges above set forth exhibit substantially increased sintering and loss of surface area at temperatures exceeding 800°C.

The importance of composition control and preparation method in producing mixed oxide catalyst support materials in accordance with the present invention are further illustrated by the DRAWING wherein:

FIG. 1 is a plot of surface area in square meters per gram versus composition in mole percent of $SnO_2$, for a series of coprecipitated mixed $CeO_2$—$SnO_2$ oxide support powders produced as hereinafter described, after sintering at 800°C. for 24 hours in air; and FIG. 2 is a scanning electron photomicrograph of a coprecipitated $CeO_2$—$SnO_2$ powder at 3150X magnification after calcining at 800°C. for 24 hours in air, wherein the arrow indicates a typical platelet of the support material of the invention and the disc represents a diameter of 4 microns.

FIG. 1 illustrates the unexpectedly high surface areas (in excess of 20 square meters per gram) retained by sintered coprecipitated $CeO_2$—$SnO_2$ catalyst support materials containing 30–90 mole percent $SnO_2$, as compared with the reduced surface areas of the sintered $CeO_2$ and $SnO_2$ components thereof produced by the same coprecipitation method.

FIG. 2 illustrates the unusual microstructure of coprecipitated $CeO_2$—$SnO_2$ catalyst support materials produced in accordance with this invention. X-ray emission spectra indicate that platelets such as the one indicated in the micrograph are $SnO_2$ platelets encrusted with $CeO_2$ particles. Pores in the platelet structure average about 0.1 micron in size. The fact that the $CeO_2$ and $SnO_2$ phases of this microstructure do not react at temperatures as high as 1000°C. probably accounts in part for the excellent surface area retention of the material.

DETAILED DESCRIPTION

Figure 1:
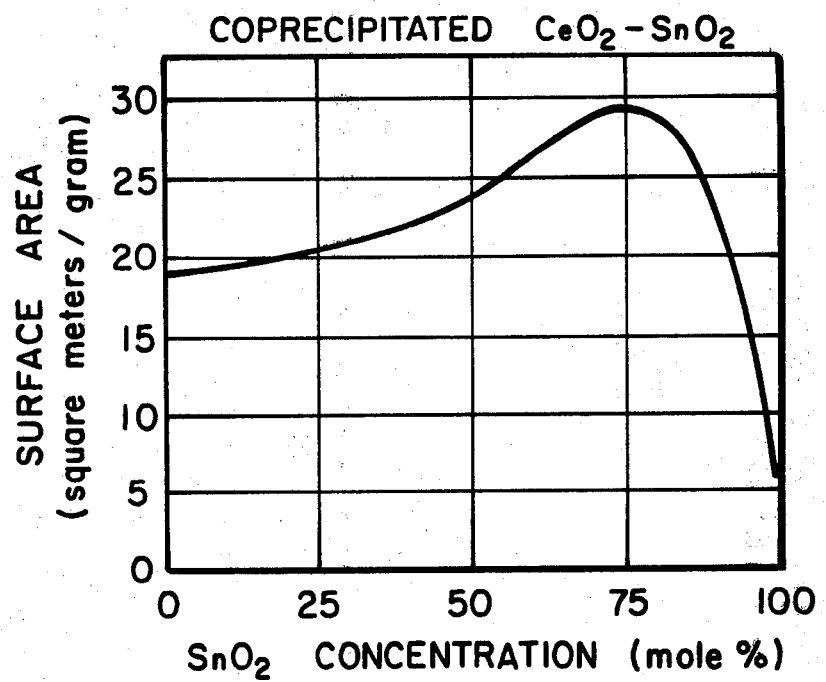
Figure 2:
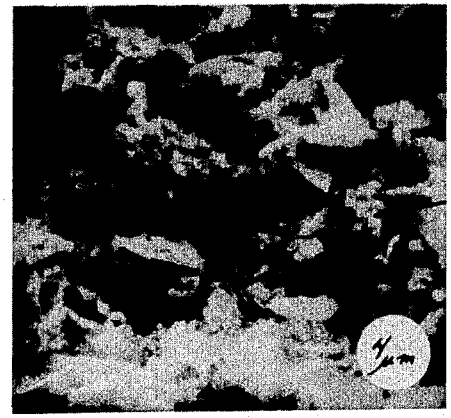

The coprecipitation of $CeO_2$ and $SnO_2$ from aqueous solutions typically involves the use of compounds of cerium and tin which are soluble in aqueous media. Some of the compounds, such as $Ce(NO_3)_3 \cdot 6H_2O$, $Na_2SnO_3 \cdot 3H_2O$, and $SnCl_4 \cdot 5H_2O$, are soluble in distilled water, while others such as $SnCl_2 \cdot 2H_2O$ are soluble in acidic aqueous solutions such as aqueous HCl.

Coprecipitation of the hydrous oxides of cerium [$Ce(OH)_4$] and tin [$H_2SnO_3$] from these solutions can involve precipitating reactions between soluble compounds of these metals, such as $Na_2SnO_3$ and $Ce(NO_3)_3$, or it can involve inducing precipitation of the compounds from aqueous acidic or neutral solutions by increasing the pH thereof with, for example, $NH_4OH$. Thus, the desired high-surface-area microstructure can be obtained utilizing acidic, neutral, or alkaline solutions, provided coprecipitation, i.e., precipitation of both hydrous oxide constituents from the same solution, is employed as the method of preparing the mixture.

Following the formation of the coprecipitated mixture in the selected solution, the precipitate is isolated by decantation or filtration and washed in the conventional manner to remove by-products of the precipitation reaction. Thorough washing with distilled water is desirable since residual impurities can substantially reduce the resistance of the product to sintering and loss of surface area at elevated temperatures.

Following washing, the precipitate may be dried by heating to a temperature sufficient to remove water of hydration therefrom, or it may be utilized in the hydrated state to provide desirable support configurations such as pellets or coatings which are subsequently dried.

Mixed $CeO_2$—$SnO_2$ catalyst support materials produced as above described may be utilized in a manner similar to conventional oxide support materials. Thus, the material may be utilized as a powder support to provide a particulate catalytic material, or it may be compacted or extruded, with or without the prior addition of catalysts, to provide beads, pellets, or other shapes. These shapes may then be used as catalytically-active constituents or as supports for additional catalysts in gas phase oxidation or other high temperature catalytic processes.

A particularly desirable catalyst support configuration for gas phase oxidation reactions at high temperatures and space velocities is a refractory ceramic honeycomb support structure. Such a structure is typically composed of alumina, silica, magnesia, cordierite, spodumene, mullite, or any other of a wide variety of crystalline compounds, mixtures, or solid solutions. The honeycomb structure provides high surface area and low resistance to fluid flow which are desirable characteristics of catalytic reactors. Examples of honeycomb structures suitable for this use are found in U.S. Pat. Nos. 3,112,184 to Hollenbach and 3,790,654 to Bagley.

In accordance with a preferred embodiment of the present invention, a conventional refractory ceramic honeycomb support structure is provided on at least a portion thereof with a coating comprising a coprecipitated mixture of $CeO_2$ and $SnO_2$ wherein the $SnO_2$ content ranges about 30–90 mole percent and the $CeO_2$ content ranges about 10–70 percent, said mixture being produced by coprecipitation as hereinabove described. The resulting catalyst support structure is useful to support noble metal or transition metal-containing catalysts which may be either incorporated into the coprecipitated $CeO_2$—$SnO_2$ mixture prior to application to the structure or applied to the structure comprising the $CeO_2$—$SnO_2$ coating in a subsequent step.

The application of the coprecipitated $CeO_2$—$SnO_2$ mixture to such a support structure may be accomplished by any conventional means. One suitable method comprises successive dipping of the honeycomb support into an aqueous suspension of previously-prepared coprecipitated oxides, followed by successive drying, until the desired coating thickness is obtained. Thereafter, the coated structure is heated to remove the suspending water by evaporation. If a catalyst is desired to be incorporated directly into the mixed oxide support coating, its constituents may be added into the suspension in any convenient form, such as a soluble salt of the selected constituent.

Any of the conventional oxidation catalysts may be used with the $CeO_2$—$SnO_2$ support materials of the present invention, including the noble metals such as platinum, palladium, rhodium, ruthenium, and iridium, and the active transition metal-containing catalysts such as the oxides, chromites, and ferrites of copper, cobalt, nickel, iron, manganese, chromium, and vanadium.

$CeO_2$—$SnO_2$ mixtures are particularly useful in support of reactive transition metal catalysts such as cobalt oxide, because interaction between such catalysts and the $CeO_2$—$SnO_2$ support to form inactive species does not normally occur at temperatures of 800°C. or below. And, in the case of certain reactive catalysts such as cobalt oxide, the compounds which are formed at temperatures of 900°C. and above are stannate compounds of spinel structure which themselves have relatively good oxidation activity.

The invention may be further understood by reference to the following detailed examples which are illustrative of the variety of methods for the preparation and use of mixed $CeO_2$—$SnO_2$ catalyst support materials which may be practiced within the scope of the invention.

EXAMPLE I

Separate solutions of a soluble cerium compound and a soluble tin compound are prepared by dissolving 86.9 grams of $Ce(NO_3)_3 \cdot 6H_2O$ in 250 cc. of distilled water in one beaker and 80.0 grams of $Na_2SnO_3 \cdot 3H_2O$ in 250 cc. of distilled water in a second beaker. The two separate solutions are then combined by pouring the $Na_2SnO_3$ solution quickly into the $Ce(NO_3)_3$ solution, and a precipitate consisting of hydrous cerium oxide (ceric hydrate-$Ce(OH)_4$) and hydrous tin oxide (hydrated $SnO_2$—$H_2SnO_3$) is formed.

This precipitate is thoroughly washed with distilled water to remove all traces of soluble sodium salts and is then dried at 140°C. to remove the wash water and water of hydration. The resulting product consists of 60 mole percent $SnO_2$ and 40 mole percent $CeO_2$.

This mixed oxide product is then divided into sample lots, and three of these lots are calcined at 800°C., 900°C., and 1000°C., respectively, for 24 hours in air. These three lots and a lot of the product as originally prepared are then subjected to surface area measurements by the nitrogen absorption technique (BET) to determine the product surface area and the effect of calcination thereon.

The results of these surface area measurements are set forth in Table I below. Included in Table I are comparative surface area data where measured for pure cerium oxide ($CeO_2$) and pure tin oxide ($SnO_2$) samples, obtained by drying the respective hydrous oxides obtained from commercial sources and subjecting lots thereof to equivalent calcination treatments.

TABLE I

| Thermal Treatment | Surface Area (square meters per gram) | | |
|---|---|---|---|
|  | $CeO_2/SnO_2$ | $CeO_2$ | $SnO_2$ |
| As Prepared | 141 | 72 | 47 |
| 800°C.-24 hours | 30 | ~1 | 5.7 |
| 900°C.-24 hours | 24 | — | ~1 |
| 1000°C.-24 hours | 13 | — | — |

The unexpectedly high surface areas of the coprecipitated $CeO_2$—$SnO_2$ samples when compared with the similarly-treated $CeO_2$ and $SnO_2$ components thereof are readily apparent from the data set forth in Table I.

EXAMPLE II

The effect of composition variations on the high-temperature surface area stability of coprecipitated $CeO_2$—$SnO_2$ mixtures is revealed by surface area examinations of a series of mixed-oxide samples having $SnO_2$ concentrations ranging from about 2.5 mole percent to about 97.5 mole percent which have been calcined at 800°C. for 24 hours prior to examination.

The samples in this series are prepared by the coprecipitation of the mixed hydrous oxides of tin and cerium from aqueous solutions using ammonium hydroxide as a precipitating agent. $Ce(NO_3)_3.6H_2O$ and $SnCl_4.5H_2O$ are added to 1 liter of water in proportions calculated to yield a selected mole ratio of $SnO_2:CeO_2$. $NH_4OH$ is then added to the solution of $Ce(NO_3)_3.6H_2O + SnCl_4.5H_2O$ in an amount sufficient to provide a pH of 9 in the solution, at which pH coprecipitation of hydrous tin oxide and cerium oxide occurs. The precipitate is then well washed and filtered until the pH of the filtrate is close to 7. Finally, each filter cake is dried at 140°C. for 16 hours, calcined at 800°C. for 24 hours, and subjected to surface area determination.

The results of these surface area determinations are reflected in the plot of surface area versus mole percent composition which comprises FIG. 1 of the drawing. As indicated in the plot, coprecipitated $CeO_2$—$SnO_2$ mixtures consisting of 30–90 mole percent $SnO_2$ and 10–70 mole percent $CeO_2$ typically retain surface areas of at least about 20 square meters per gram even following calcination at 800°C. for 24 hours in air. Preferred $CeO_2$—$SnO_2$ mixtures for use as catalyst support materials in accordance with the present invention consist of 60–80 mole percent $SnO_2$ and 20–40 mole percent $CeO_2$, and retain surface areas in excess of 25 square meters per gram after calcination at temperatures not exceeding 800°C.

EXAMPLE III

A stannous chloride solution is prepared by adding 33.8 grams of $SnCl_2.2H_2O$ to 220 cc. of 2.4 Normal hot HCl. To this solution are added 22.5 grams of $Ce(NO_3)_3.6H_2O$ and sufficient water to total 500 cc. The solution thereafter is cooled to room temperature and sufficient $NH_4OH$ is added to adjust the pH of the solution to 9. At this pH, a precipitate consisting of a mixture of hydrous cerium and tin oxides is formed. This precipitate is separated by filtration and repeatedly washed and filtered until the pH of the filtrate is near 7. The filter cake is then dried to provide a mixture consisting of 25 mole percent $CeO_2$ and 75 mole percent $SnO_2$.

High temperature calcination of this product shows that a surface area of about 31 square meters per gram is retained after calcination at 800°C. for 24 hours in air.

EXAMPLE IV

The importance of utilizing coprecipitation as the method of producing catalyst supports in accordance with the invention is shown by the substantially reduced surface areas which may be exhibited by mixtures produced by other methods.

A predetermined quantity of $Ce(No_3)_3.6H_2O$ is melted on a hot plate and a second quantity of $SnO_2$ is added to the fused salt with stirring to provide a homogeneous mixture of components. This mixture is then dried on the hot plate to provide a $CeO_2$—$SnO_2$ mixture consisting of 25 mole percent $CeO_2$ and 75 mole percent $SnO_2$.

High temperature calcination of this product shows that a surface area of only about 3.4 square meters per gram is retained after calcination at 800°C. for 24 hours in air.

The following examples illustrate some methods of using $CeO_2$—$SnO_2$ catalyst support material produced in accordance with the invention.

EXAMPLE V

A coprecipitated, dried, powdered $CeO_2$—$SnO_2$ support material consisting of 25 mole percent $CeO_2$ and 75 mole percent $SnO_2$ is added to an aqueous solution of $Co(NO_3)_3.6H_2O$ to provide a suspension of the support material in the solution.

The water is then evaporated from the suspension and the dried product is calcined at 900°C. for 24 hours to provide a particulate supported catalyst consisting of 97.8% $CeO_2$—$SnO_2$ support material and 2.2% CoO catalyst by weight.

This particulate catalyst is quite active for the oxidation of carbon monoxide and hydrocarbons, oxidizing substantial proportions of carbon monoxide and n-hexane present in a test gas stream passed over the catalyst at reaction zone temperatures as low as 400°F.

Catalyst support materials produced in accordance with the invention are particularly suitable for use in the form of coatings disposed on the interior channel walls of refractory ceramic honeycomb support structures to support oxidation catalysts in high-temperature, high-space-velocity oxidation processes. The desirable high temperature surface area retention characteristics of this material are particularly important, for example, in the oxidative catalytic treatment of automotive exhaust gases, where reaction temperatures in the catalytic converter can reach and even substantially exceed 800°C. The following example illustrates the use of mixed $CeO_2$—$SnO_2$ support materials as coatings on honeycomb support structures to support a cobalt oxide oxidation catalyst for automotive use.

EXAMPLE VI

A coprecipitated, dried, powdered $CeO_2$—$SnO_2$ support material consisting of 25 mole percent $CeO_2$ and 75 mole percent $SnO_2$ is added to an aqueous solution of $Co(NO_3)_3.6H_2O$ to provide an aqueous suspension of the support material in the solution.

A cylindrical refractory ceramic honeycomb support structure about one inch in diameter and 2 5/16 inches in length, composed of crystalline cordierite and having about 200 square channels per square inch of cross-sectional area traversing its length, is selected for treatment. This honeycomb support is immersed in the aqueous suspension of the powdered support material and dissolved cobalt nitrate, removed, and dried with warm forced air to form a dried coating on the support. The immersion and drying steps are repeated until a coating loading comprising about 3.0% by weight of the coated honeycomb support structure is achieved. Finally, the coated honeycomb is calcined at 800°C. in air for 24 hours. The catalytic device so produced consists of a cordierite honeycomb support structure comprising an active coating making up about 3.0% of the weight thereof which consists of 96.1% coprecipitated $CeO_2$—$SnO_2$ support material and 3.9% active CoO by weight.

This catalytic device is tested for catalytic activity utilizing a simulated automotive exhaust gas containing propylene and carbon monoxide which is passed through the device at a space velocity of about 15,000 $hr^{-1}$. The device removes, by oxidation, 50% of the carbon monoxide present in the stream at a device operating temperature of 425°F. and 50% of the propylene present in the stream at a device operating temperature of 580°F.

Of course, oxidation catalysts other than cobalt oxide may be supported by mixed $CeO_2$—$SnO_2$ support materials utilized as powders, coatings, or other support configurations. Also, the catalysts may be subsequently applied to coprecipitated $CeO_2$—$SnO_2$ support materials, whether utilized as powders, pellets, or coatings on refractory ceramic honeycomb supports, and this procedure may be preferred where extremely low loadings of very active catalysts, e.g., noble metals, are to be employed.

I claim:

1. A thermally-stable high-surface-area catalyst support material consisting of a mixture of $CeO_2$ and $SnO_2$ wherein the $SnO_2$ content ranges about 30–90 mole percent and the $CeO_2$ ranges about 10–70 mole percent, said mixture being produced by coprecipitating hydrous cerium oxide and hydrous tin oxide from an aqueous solution of salts of cerium and tin, washing the coprecipitated hydrous oxides, and drying the coprecipitated hydrous oxides by heating to a temperature sufficient to remove the water of hydration therefrom.

2. A catalyst support material in accordance with claim 1 wherein the $SnO_2$ content ranges from about 60–80 mole percent and the $CeO_2$ content ranges from about 20–40 mole percent.

3. A catalyst support structure comprising a refractory ceramic honeycomb support structure having on at least a portion thereof a coating consisting of a mixture of $CeO_2$ and $SnO_2$ wherein the $SnO_2$ content ranges about 30–90 mole percent and the $CeO_2$ content ranges about 10–70 mole percent, said mixture being produced by coprecipitating hydrous cerium oxide and hydrous tin oxide from an aqueous solution of salts of cerium and tin, washing the coprecipitated hydrous oxides, and drying the coprecipitated hydrous oxides by heating to a temperature sufficient to remove the water of hydration therefrom.

4. A catalyst support structure in accordance with claim 3 where the coating consists of 60–80 mole percent $SnO_2$ and 20–40 percent $CeO_2$.

* * * * *